United States Patent
Matsubara

(10) Patent No.: US 9,879,772 B2
(45) Date of Patent: Jan. 30, 2018

(54) POWER TRANSFER DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventor: Mitsumasa Matsubara, Nagoya (JP)

(73) Assignees: AISIN AW CO., LTD., Anjo-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/113,904

(22) PCT Filed: Mar. 10, 2015

(86) PCT No.: PCT/JP2015/057002
§ 371 (c)(1),
(2) Date: Jul. 25, 2016

(87) PCT Pub. No.: WO2015/146573
PCT Pub. Date: Oct. 1, 2015

(65) Prior Publication Data
US 2017/0009871 A1 Jan. 12, 2017

(30) Foreign Application Priority Data
Mar. 27, 2014 (JP) ................. 2014-066503

(51) Int. Cl.
*F16H 57/04* (2010.01)
*F16H 57/037* (2012.01)
(Continued)

(52) U.S. Cl.
CPC ........... *F16H 57/037* (2013.01); *F16H 48/06* (2013.01); *F16H 57/03* (2013.01); *F16H 57/04* (2013.01);
(Continued)

(58) Field of Classification Search
None
See application file for complete search history.

(56) References Cited

U.S. PATENT DOCUMENTS 4,480,501 A * 11/1984 von Kaler .............. B60K 17/08
475/206
5,718,651 A * 2/1998 Merkle ............... F16H 57/0421
475/159

(Continued)

FOREIGN PATENT DOCUMENTS

JP 49-23377 Y1 6/1974
JP 52-85878 U 6/1977
(Continued)

OTHER PUBLICATIONS

International Search Report for PCT/JP2015/057002 dated Jun. 2, 2015.

*Primary Examiner* — Justin Holmes
(74) *Attorney, Agent, or Firm* — Sughrue Mion, PLLC

(57) ABSTRACT

A transaxle case with an overhanging portion that overhangs outward relative to a vertical line (a tangential line) that extends upward from a 90-degree rotated portion at a location rotated from the vertically lower portion of a differential ring gear by 90 degrees, and an extending rib that extends from the overhanging portion toward the center of rotation of the differential ring gear to the vicinity of the outer periphery of the differential ring gear, and the overhanging portion and the extending rib constitute a splattering space. The lower surface of the extending rib is formed as an inclined surface such that working oil is pushed toward a converter housing when working oil splattered to the splattering space collides against the lower surface. Consequently, working oil is caused to be splattered to the splattering space, collides against the lower surface of the extending rib, and pushed toward the converter housing.

13 Claims, 7 Drawing Sheets

(51) Int. Cl.
*F16H 48/06* (2006.01)
*F16H 57/03* (2012.01)
*F16H 48/08* (2006.01)

(52) U.S. Cl.
CPC ....... *F16H 57/045* (2013.01); *F16H 57/0424* (2013.01); *F16H 57/0452* (2013.01); *F16H 57/0457* (2013.01); *F16H 57/0483* (2013.01); *F16H 48/08* (2013.01)

(56) References Cited

U.S. PATENT DOCUMENTS

| | | | |
|---|---|---|---|
| 5,768,954 A * | 6/1998 | Grabherr | F16H 57/0447 184/11.1 |
| 8,371,978 B2 | 2/2013 | Nobata et al. | |
| 2006/0123944 A1 * | 6/2006 | Suzuki | F16H 57/0483 74/606 R |
| 2011/0041649 A1 * | 2/2011 | Iwata | F16H 57/0447 74/606 R |
| 2011/0245010 A1 * | 10/2011 | Nobata | F16H 57/0457 475/160 |

FOREIGN PATENT DOCUMENTS

| | | |
|---|---|---|
| JP | 2010-223344 A | 10/2010 |
| WO | 2011/121861 A1 | 10/2011 |

* cited by examiner

FIG. 2

|   |     | C-1 | C-2 | C-3 | C-4 | B-1 | B-2 | F-1 |
|---|-----|-----|-----|-----|-----|-----|-----|-----|
| D | 1st | ○ |   |   |   |   | ● | ○ |
|   | 2nd | ○ |   |   |   | ○ |   |   |
|   | 3rd | ○ |   | ○ |   |   |   |   |
|   | 4th | ○ |   |   | ○ |   |   |   |
|   | 5th | ○ | ○ |   |   |   |   |   |
|   | 6th |   | ○ |   | ○ |   |   |   |
|   | 7th |   | ○ | ○ |   |   |   |   |
|   | 8th |   | ○ |   |   | ○ |   |   |
| REV1 | |   |   | ○ |   |   | ○ |   |
| REV2 | |   |   |   | ○ |   | ○ |   |

※○: ENGAGED,
● : ENGAGED WITH ENGINE BRAKE IN OPERATION

POWER TRANSFER DEVICE

CROSS REFERENCE TO RELATED APPLICATIONS

This application is a National Stage of International Application No. PCT/JP2015/057002 filed Mar. 10, 2015, claiming priority based on Japanese Patent Application No. 2014-066503 filed Mar. 27, 2014, the contents of all of which are incorporated herein by reference in their entirety.

TECHNICAL FIELD

The present disclosure relates to a power transfer device, and in particular to a power transfer device that includes a differential ring gear disposed below a drive pinion gear on the input side and meshed with the drive pinion gear, a differential gear coupled to the differential ring gear, and a case that houses the differential ring gear and the differential gear.

BACKGROUND ART

There has hitherto been known a power transfer device that includes a counter shaft disposed in parallel with an input shaft of a speed change mechanism, a differential device (differential gear) that has a ring gear (differential ring gear) disposed below the counter shaft and meshed with an output gear of the counter shaft, a case member that houses the speed change mechanism and the differential device, and a differential partitioning member that partitions a space in the case member into a differential chamber, in which the differential device is housed, and a storage chamber, in which oil (working oil) is stored (see Patent Document 1, for example). In the power transfer device, the differential partitioning member is composed of a part of the case member, a rib member provided to extend along the outer peripheral surface of the ring gear from the case member, and a hemispherical reservoir plate disposed so as to cover the differential device from the side opposite to the case member and tightly contact the inner peripheral surface of the rib member. Consequently, in the power transfer device, an inflow of oil from the storage chamber into the differential chamber is suppressed by the differential partitioning member.

RELATED-ART DOCUMENTS

Patent Documents

[Patent Document 1] International Publication WO 2011/121861

SUMMARY

In the power transfer device according to the related art, however, it is difficult to bring the reservoir plate into completely tight contact with the inner peripheral surface of the rib member, and a clearance is also formed between the reservoir plate and the inner surface of the case. Therefore, oil in the storage chamber flows into the differential chamber through the clearance between the reservoir plate and the rib member and the clearance between the reservoir plate and the inner surface of the case. Oil that resides in the differential chamber is raked up by the ring gear of the differential device to be used for lubrication and cooling. If the amount of oil that resides in the differential chamber is increased, however, the stirring resistance of oil which acts on the ring gear may be increased.

It is a main object of the power transfer device according to the present disclosure to suppress a residence of working oil in a differential chamber in which a differential ring gear and a differential gear are disposed, and to further reduce the stirring resistance of working oil which acts on the differential ring gear.

In order to achieve the foregoing main object, the power transfer device according to the present disclosure adopts the following means.

The present disclosure provides a power transfer device including: a differential ring gear disposed below a drive pinion gear on the input side and meshed with the drive pinion gear; a differential gear coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, wherein:

the case has a first case member which is provided with a first case mating surface at an outer edge and in which the working oil storage chamber is formed by the partitioning member, and a second case member which is provided with a second case mating surface aligned with the first case mating surface and in which the differential chamber is formed by the partitioning member;

the second case member has an overhanging portion that overhangs outward with respect to a vertical line that extends upward from a 90-degree rotated portion which is a portion of an outer wall surface along the second case mating surface at a location rotated from a vertically lower portion of the differential ring gear by 90 degrees in a rotational direction of the differential ring gear, and an extending rib that extends from the overhanging portion toward a substantive center of rotation of the differential ring gear, and a splattering space to which working oil raked up by the differential ring gear is splattered is formed by an inner surface of the overhanging portion, a lower surface of the extending rib, and an outer periphery of the differential ring gear; and the lower surface of the extending rib is formed as an inclined surface raised on the second case mating surface side.

In the power transfer device according to the present disclosure, the case has the first case member which is provided with the first case mating surface at the outer edge and in which the working oil storage chamber is formed by the partitioning member, and the second case member which is provided with the second case mating surface which is aligned with the first case mating surface and in which the differential chamber is formed by the partitioning member. The second case member has the overhanging portion which overhangs outward with respect to a vertical line that extends upward from the 90-degree rotated portion which is a portion of an outer wall surface along the second case mating surface at a location rotated from the vertically lower portion of the differential ring gear by 90 degrees in the rotational direction of the differential ring gear, and the extending rib which extends from the overhanging portion toward the substantive center of rotation of the differential ring gear, and the splattering space to which working oil raked up by the differential ring gear is splattered is formed by the inner surface of the overhanging portion, the lower surface of the extending rib, and the outer periphery of the differential ring gear. The lower surface of the extending rib is formed as an inclined surface raised on the second case mating surface side. Thus, working oil raked up by the differential ring gear to be splattered to the splattering space collides against the lower surface of the extending rib, and is pushed toward the second case mating surface, that is, toward the working oil storage chamber which is formed by the partitioning member. Therefore, it is possible to suppress a residence of working oil in the differential chamber, and to further reduce the stirring resistance of working oil which acts on the differential ring gear.

BRIEF DESCRIPTION OF THE DRAWINGS

FIG. 2 is an operation table illustrating the relationship between each shift speed of an automatic transmission 25 included in the power transfer device 20 of FIG. 1 and the respective operating states of clutches and brakes.

DETAILED DESCRIPTION OF THE PREFERRED EMBODIMENT

Now, an embodiment of the present disclosure will be described with reference to the drawings.

Figure 1:
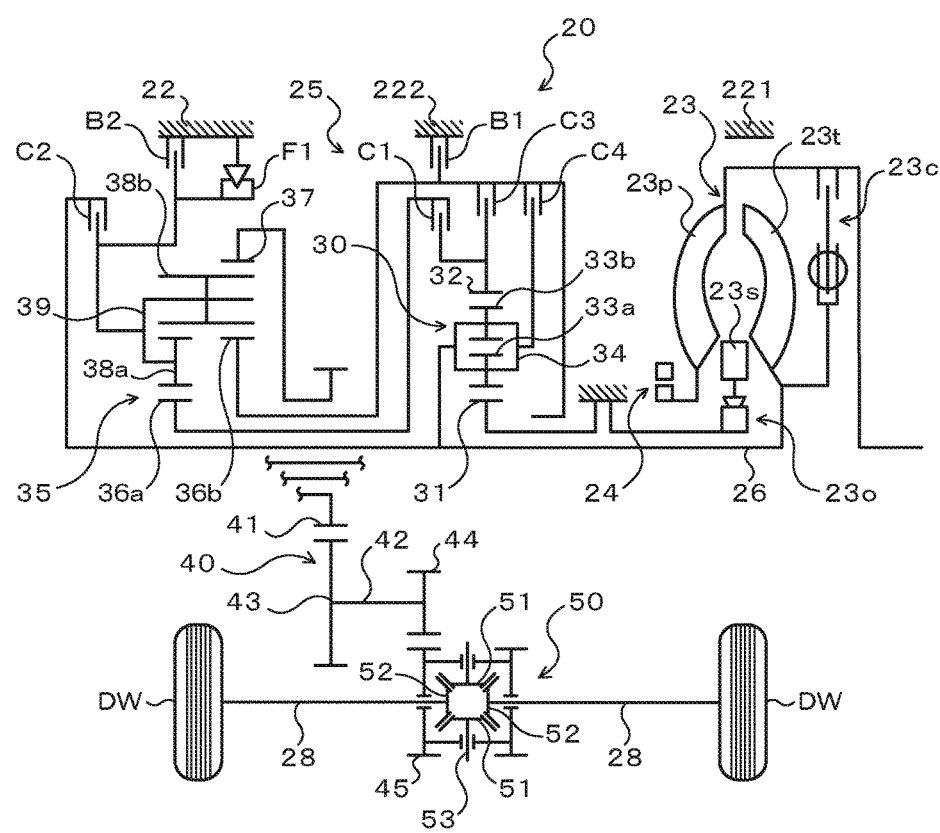
FIG. 1 is a schematic configuration diagram of a power transfer device 20 according to the present disclosure.

FIG. 1 is a schematic configuration diagram of a power transfer device 20 according to the present disclosure. The power transfer device 20 illustrated in the drawing is connected to a crankshaft of an engine (not illustrated) mounted on a front-drive vehicle, and can transfer power from the engine to left and right drive wheels (front wheels) DW. As illustrated in the drawing, the power transfer device 20 includes a transmission case 22 that includes a converter housing 220 (first case member) and a transaxle case 240 (second case member) coupled to the converter housing 220, a fluid transmission apparatus (starting device) 23 housed in the converter housing 220, an oil pump 24, an automatic transmission 25 housed in the transaxle case 240, a gear mechanism (gear train) 40, a differential gear (differential mechanism) 50, and so forth.

The fluid transmission apparatus 23 is structured as a torque converter that includes a pump impeller 23$p$ on the input side connected to the crankshaft of the engine, a turbine runner 23$t$ on the output side connected to an input shaft 26 of the automatic transmission 25, a stator 23$s$ disposed on the inner side of the pump impeller 23$p$ and the turbine runner 23$t$ to rectify the flow of working oil from the turbine runner 23$t$ to the pump impeller 23$p$, a one-way clutch 23$o$ that restricts the rotational direction of the stator 23$s$ to one direction, a lock-up clutch 23$c$, and so forth. It should be noted, however, that the fluid transmission apparatus 23 may be structured as a fluid coupling that does not include the stator 23$s$.

The oil pump 24 is structured as a gear pump that includes a pump assembly composed of a pump body and a pump cover, and an externally toothed gear connected to the pump impeller 23$p$ of the fluid transmission apparatus 23 via a hub. The oil pump 24 is driven by power from the engine to suction working oil (ATF) stored in an oil pan (not illustrated) and pump the working oil to a hydraulic control device (not illustrated).

The automatic transmission 25 is structured as an 8-speed transmission. As illustrated in FIG. 1, the automatic transmission 25 includes a double-pinion type first planetary gear mechanism 30, a Ravigneaux type second planetary gear mechanism 35, and four clutches C1, C2, C3, and C4, two brakes B1 and B2, and a one-way clutch F1 that change a power transfer path from the input side to the output side.

The first planetary gear mechanism 30 includes a sun gear 31 which is an externally toothed gear, a ring gear 32 which is an internally toothed gear disposed concentrically with the sun gear 31, and a planetary carrier 34 that rotatably and revolvably holds a plurality of sets of two pinion gears 33$a$ and 33$b$ meshed with each other, one of the pinion gears 33$a$ and 33$b$ being meshed with the sun gear 31 and the other being meshed with the ring gear 32. As illustrated in the drawing, the sun gear 31 of the first planetary gear mechanism 30 is held stationary to the transmission case 22, and the planetary carrier 34 of the first planetary gear mechanism 30 is connected so as to be rotatable together with the input shaft 26. In addition, the first planetary gear mechanism 30 is structured as a so-called speed reduction gear, and reduces the speed of power transferred to the planetary carrier 34 which serves as an input element to output the power from the ring gear 32 which serves as an output element.

The second planetary gear mechanism 35 includes a first sun gear 36$a$ and a second sun gear 36$b$ which are each an externally toothed gear, a ring gear 37 which is an internally toothed gear disposed concentrically with the first and second sun gears 36$a$ and 36$b$, a plurality of short pinion gears 38$a$ meshed with the first sun gear 36$a$, a plurality of long pinion gears 38$b$ meshed with the second sun gear 36$b$ and the plurality of short pinion gears 38$a$ and meshed with the ring gear 37, and a planetary carrier 39 that rotatably and revolvably holds the plurality of short pinion gears 38$a$ and the plurality of long pinion gears 38$b$. The ring gear 37 of the second planetary gear mechanism 35 functions as an output member of the automatic transmission 25. Power transferred from the input shaft 26 to the ring gear 37 is transferred to the left and right drive wheels via the gear mechanism 40, the differential gear 50, and a drive shaft 28. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch (friction engagement element) that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the first sun gear 36$a$ of the second planetary gear mechanism 35 to and from each other. The clutch C2 is a multi-plate friction-type hydraulic clutch that has a hydraulic servo structured from a piston, a plurality of friction plates and mating plates, an oil chamber supplied with hydraulic oil, and so forth, and that is capable of fastening and unfastening the input shaft 26 and the planetary carrier 39 of the second planetary gear mechanism 35 to and from each other. The clutch C3 is a multi-plate friction-type hydraulic clutch that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the second sun gear 36b of the second planetary gear mechanism 35 to and from each other. The clutch C4 is a multi-plate friction-type hydraulic clutch that has a hydraulic servo structured from a piston, a plurality of friction plates and mating plates, an oil chamber supplied with working oil, and so forth, and that is capable of fastening and unfastening the planetary carrier 34 of the first planetary gear mechanism 30 and the second sun gear 36b of the second planetary gear mechanism 35 to and from each other.

The brake B1 is a hydraulic brake (friction engagement element) that is structured as a band brake or a multi-plate friction-type brake including a hydraulic servo, and that is capable of making the second sun gear 36b of the second planetary gear mechanism 35 stationary and movable with respect to the transmission case 22. The brake B2 is a hydraulic brake that is structured as a band brake or a multi-plate friction-type brake including a hydraulic servo, and that is capable of making the planetary carrier 39 of the second planetary gear mechanism 35 stationary and movable with respect to the transmission case 22. In addition, the one-way clutch F1 includes an inner race, an outer race, a plurality of sprags, and so forth, for example. The one-way clutch F1 transfers torque via the sprags when the outer race rotates in one direction with respect to the inner race, and allows the inner race and the outer race to rotate with respect to each other when the outer race rotates in the other direction with respect to the inner race. It should be noted, however, that the one-way clutch F1 may be of a roller type or the like, other than the sprag type.

The clutches C1 to C4 and the brakes B1 and B2 operate with working oil supplied thereto and discharged therefrom by the hydraulic control device (not illustrated). FIG. 2 is an operation table illustrating the relationship between each shift speed of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least one of the clutches C1 to C4 and the brakes B1 and B2 may be a meshing engagement element such as a dog clutch.

The gear mechanism 40 includes: a counter drive gear 41 coupled to the ring gear 37 of the second planetary gear mechanism 35 of the automatic transmission 25; a counter driven gear 43 fixed to a counter shaft 42 that extends in parallel with the input shaft 26 of the automatic transmission 25 and meshed with the counter drive gear 41; a drive pinion gear (final drive gear) 44 formed on (or fixed to) the counter shaft 42; and a differential ring gear (final driven gear) 45 disposed below the drive pinion gear 44 (see FIG. 3) and meshed with the drive pinion gear 44. The differential ring gear 45 is constituted as a helical gear.

As illustrated in FIGS. 1 and 3 to 6, the differential gear 50 includes a pair of (two) pinion gears 51, a pair of (two) side gears 52 each fixed to the drive shaft 28 and meshed with the pair of pinion gears 51 at a right angle, a pinion shaft 53 that supports the pair of pinion gears 51, and a differential case 54 which houses the pair of pinion gears 51 and the pair of side gears 52 and to which the differential ring gear 45 discussed above is coupled (fixed). In the embodiment, the pinion gears 51 and the side gears 52 are each structured as a straight bevel gear. In addition, a pinion washer 55 is disposed between each of the pinion gears 51 and the differential case 54, and a side washer 56 is disposed between each of the side gears 52 and the differential case 54. The differential case 54 is rotatably supported by the transmission case 22 via bearings 81 and 82 coaxially with the drive shaft 28.

Figure 3:
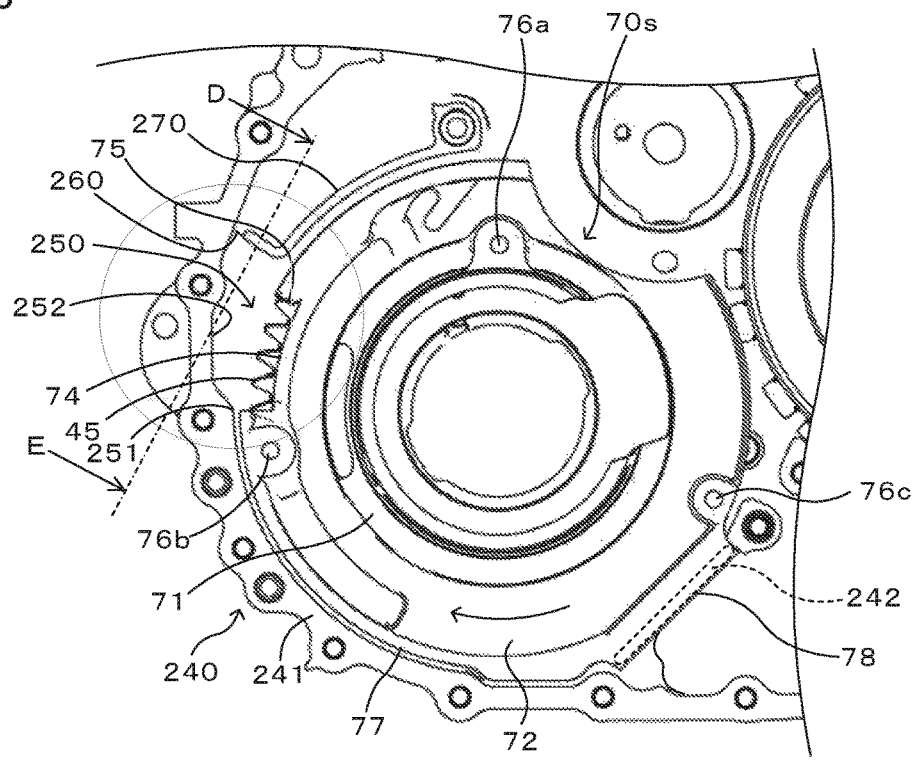
FIG. 3 is an explanatory diagram illustrating a state in which a reservoir plate 70 is disposed on a transaxle case 240.
Figure 4:
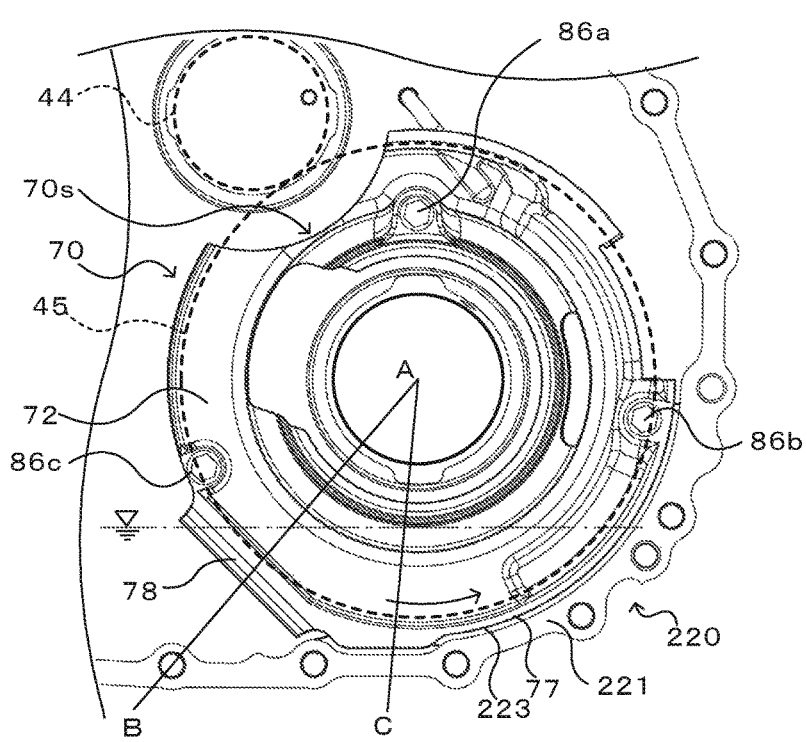
FIG. 4 is an explanatory diagram illustrating a state in which the reservoir plate 70 is attached to a converter housing 220.
Figure 5:
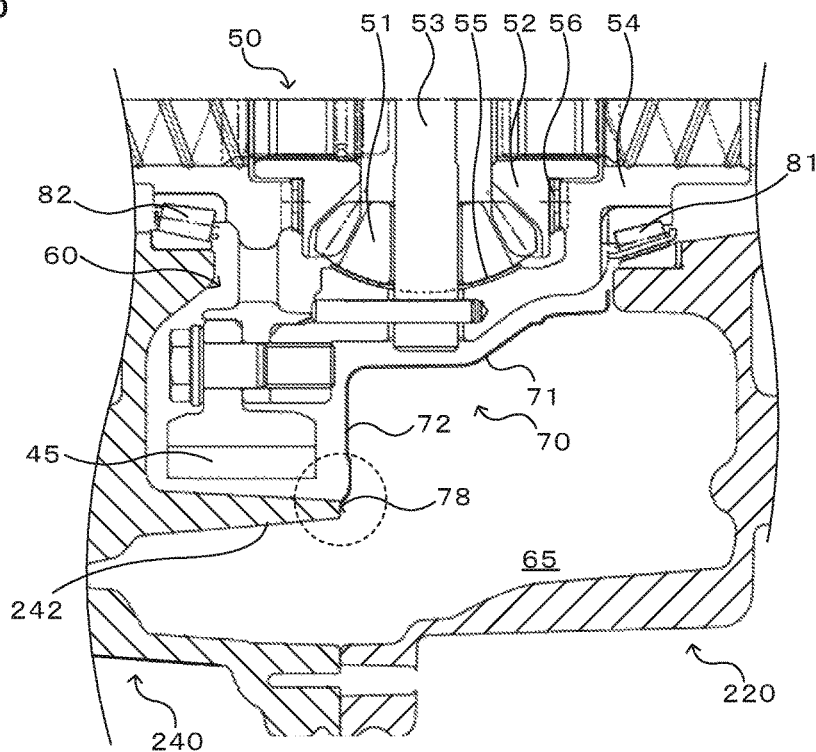
FIG. 5 is an explanatory diagram illustrating a sectional view taken along the line A-B in FIG. 4.
Figure 6:
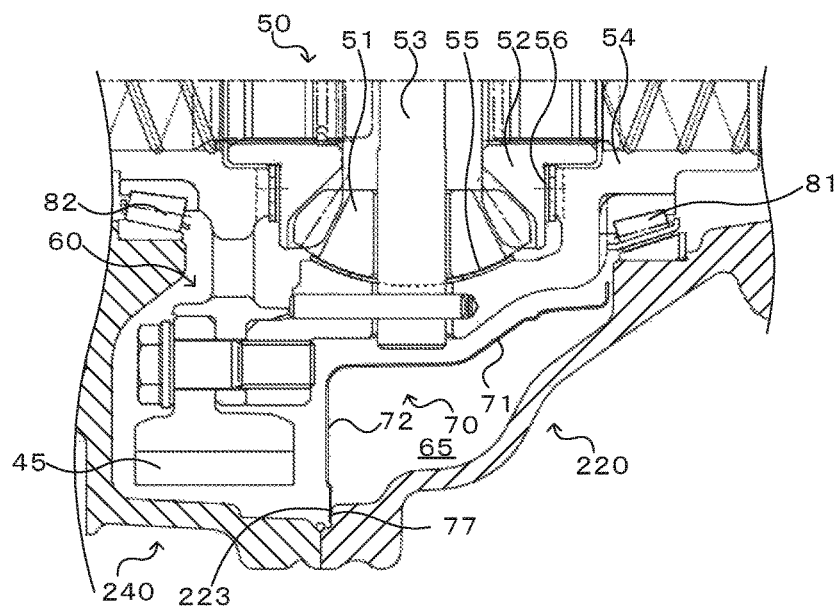
FIG. 6 is an explanatory diagram illustrating a sectional view taken along the line A-C in FIG. 4.

Subsequently, the structure around the differential ring gear 45 and the differential gear 50 in the power transfer device 20 will be described. FIG. 3 is an explanatory diagram illustrating a state in which the reservoir plate 70 is disposed on the transaxle case 240. FIG. 4 is an explanatory diagram illustrating a state in which the reservoir plate 70 is attached to the converter housing 220. FIG. 5 is an explanatory diagram illustrating a sectional view taken along the line A-B in FIG. 4. FIG. 6 is an explanatory diagram illustrating a sectional view taken along the line A-C in FIG. 4. In FIG. 4, the upper left circle in the broken line indicates the drive pinion gear 44, and the center circle in the broken line indicates the differential ring gear 45. In FIG. 4, in addition, the dash-and-dot line indicates the liquid surface of working oil in a working oil storage chamber 65. In FIGS. 3 and 4, the arrow indicates the rotational direction of the differential ring gear 45.

Figure 7:
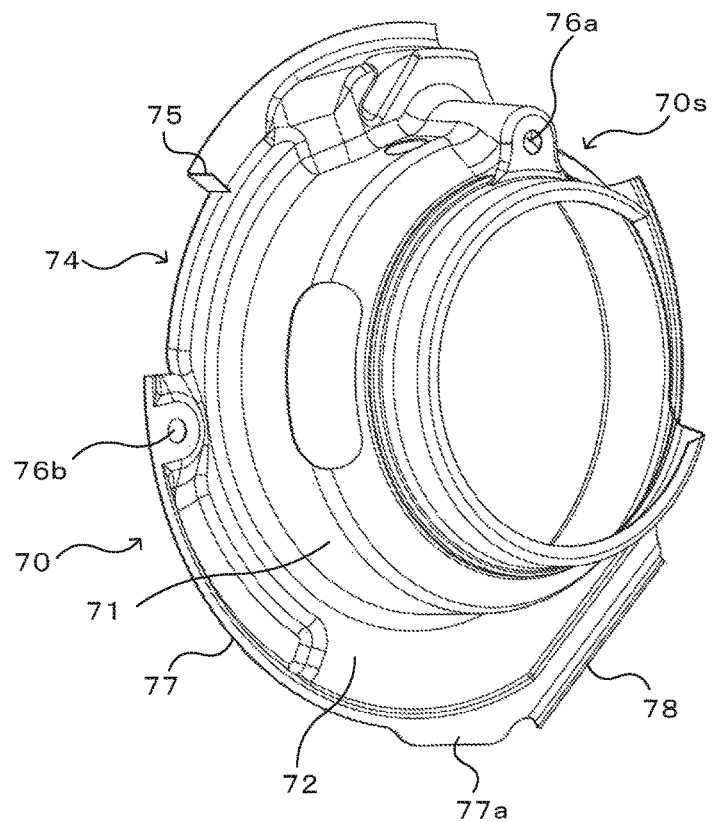
FIG. 7 is a view showing the outer appearance of the reservoir plate 70.
Figure 8:
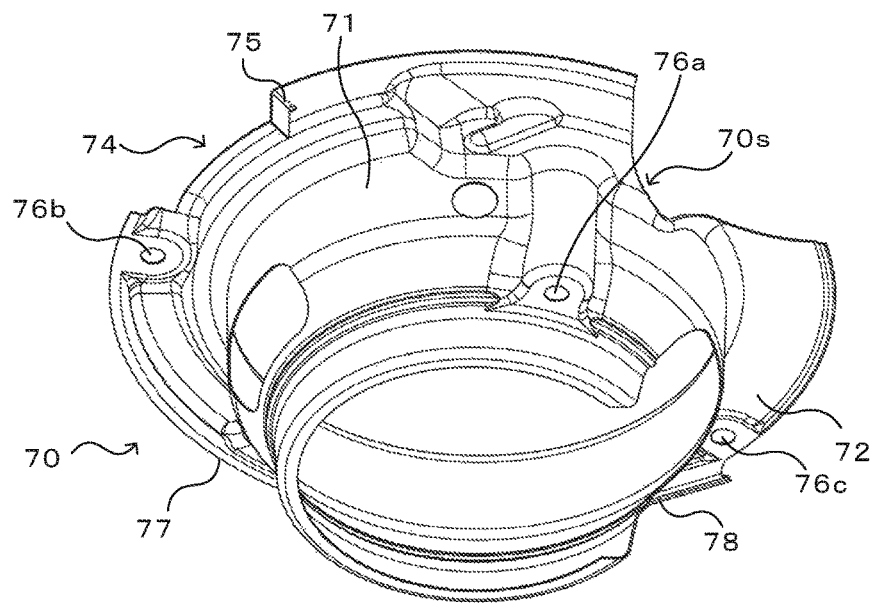
FIG. 8 is a view showing the outer appearance of the reservoir plate 70.
Figure 9:
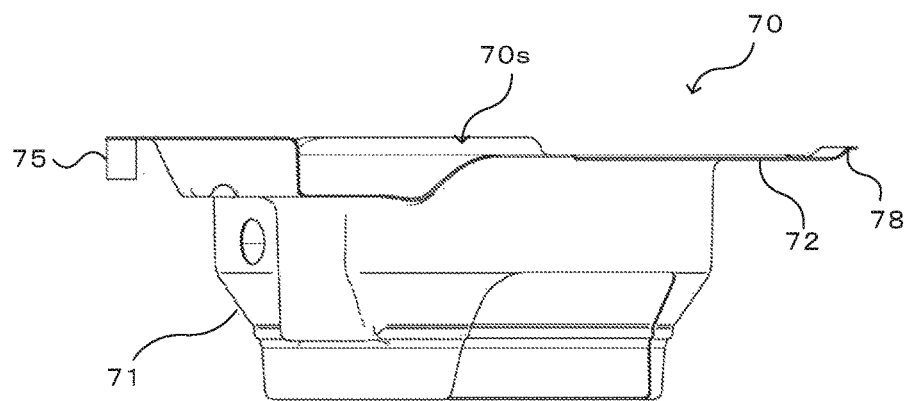
FIG. 9 is a view showing the outer appearance of the reservoir plate 70.

As illustrated in the drawings, a space inside the transmission case 22 which includes the converter housing 220 and the transaxle case 240 is partitioned by the reservoir plate 70 illustrated in FIGS. 7, 8, and 9 into a differential chamber 60, in which the differential ring gear 45 and the differential gear 50 are disposed, and the working oil storage chamber 65, in which working oil is stored. In the following description, the terms "upper" and "lower" indicate the "upper" and "lower" sides, respectively, in the vertical direction with the power transfer device 20 mounted on the vehicle.

As illustrated in FIG. 4, the converter housing 220 has a housing-side mating surface (first case mating surface) 221 for assembly to the transaxle case 240. A housing-side stepped surface 223 that is stepped inward by about the thickness of the reservoir plate 70 is formed along the housing-side mating surface 221 in the range from the vicinity of the bottom portion of the housing-side mating surface 221 to a location above and to the right in the drawing by approximately 90 degrees along the outer edge of the reservoir plate 70.

As illustrated in FIG. 3, the transaxle case 240 has a case-side mating surface (second case mating surface) 241 for assembly to the converter housing 220. The transaxle case 240 is provided with a rib 242 (see FIG. 5) that extends linearly and rightward in the drawing from the vicinity of the bottom portion toward the center at an angle of approximately 45 degrees.

As illustrated in FIGS. 7 to 9, the reservoir plate 70 includes a tubular portion 71 and a flange portion 72 that extends radially outward from the tubular portion 71. As illustrated in FIG. 3, the reservoir plate 70 is attached and fixed to the converter housing 220 by three bolts 86a to 86c using a bolt hole 76a formed in the tubular portion 71 and two bolt holes 76b and 76c formed in the flange portion 72. The reservoir plate 70 which is constituted from the tubular portion 71 and the flange portion 72 is formed by pressing a metal material such as iron. The reservoir plate 70 may be molded from a resin by injection molding.

As illustrated in FIGS. 5 and 6, the tubular portion 71 is formed to extend along a part of the outer peripheral surface of the differential case 54 of the differential gear 50, and mainly surrounds a portion of the differential case 54 excluding a side gear support portion (a portion supported by the converter housing 220 via the bearing 81) on one side of the differential case 54. A slight clearance is defined between an end portion of the tubular portion 71 on the converter housing 220 side and the converter housing 220 with the reservoir plate 70 fixed to the transmission case 22.

The flange portion 72 extends radially outward from an end portion of the tubular portion 71 on the transaxle case 240 side. In addition, a notched portion 70s is formed above the flange portion 72 and the tubular portion 71 so as not to interfere with a bearing (not illustrated) that rotatably supports the counter shaft 42. Consequently, the flange portion 72 extends in an arc shape (in a generally C-shape) around the tubular portion 71. As illustrated in FIG. 4, a first seal portion 77 is formed at the outer edge portion of the flange portion 72 from the bottom portion to a location above and to the right in the drawing by approximately 90 degrees, including the bottom portion. The first seal portion 77 abuts against the housing-side stepped surface 223 of the converter housing 220 to secure seal of the first seal portion 77. In addition, a second seal portion 78 is formed at the outer edge portion of the flange portion 72 from the first seal portion 77 to a location above and to the left in the drawing by approximately 60 degrees. As illustrated in FIGS. 3, 4, and 7 to 9, the outer edge of the second seal portion 78 is formed linearly, and the second seal portion 78 is formed so as to project toward the rib 242 of the transaxle case 240 such that the outer edge of the second seal portion 78 easily abuts against the rib 242. Therefore, the second seal portion 78 is pressed by the rib 242 to be elastically deformed, which secures seal of the second seal portion 78 better.

Figure 10:
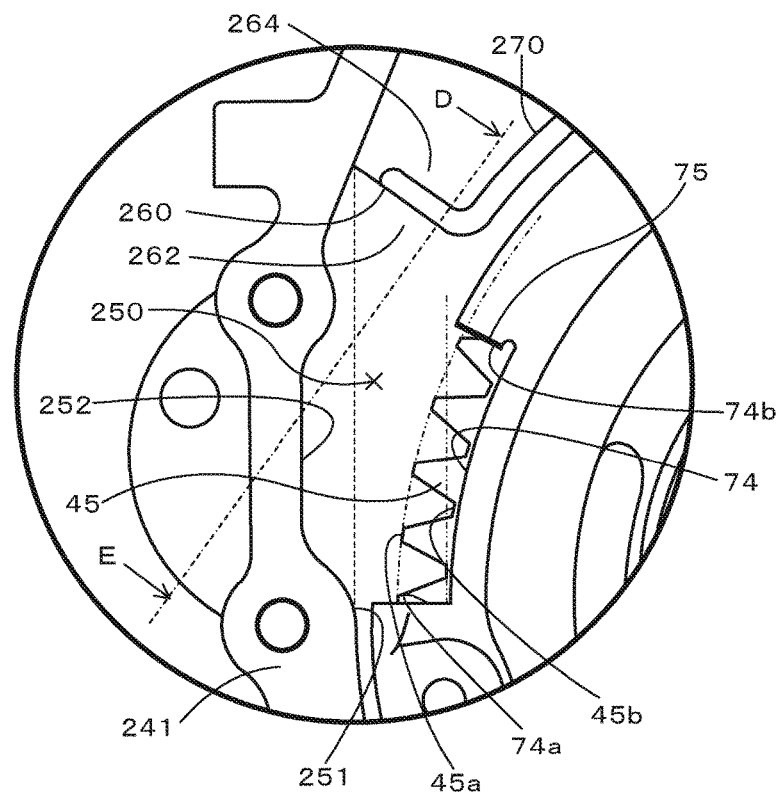
FIG. 10 is an enlarged explanatory diagram illustrating the range of a circle in the broken line in FIG. 3 as enlarged.
Figure 11:
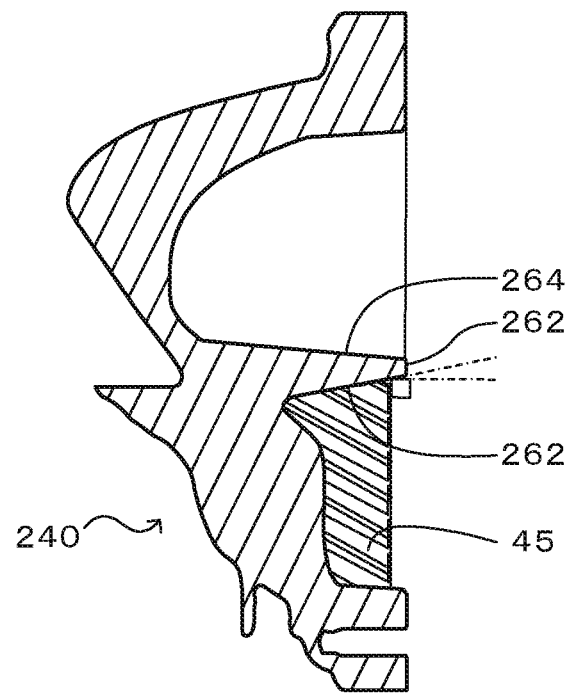
FIG. 11 is an explanatory diagram illustrating a sectional view taken along the line D-E in FIGS. 3 and 10.

FIG. 10 is an enlarged explanatory diagram illustrating the portion of a circle in the broken line in FIG. 3 as enlarged. FIG. 11 is an explanatory diagram illustrating a sectional view taken along the line D-E in FIGS. 3 and 10. As illustrated in FIGS. 3 and 10, the transaxle case 240 is provided with: an overhanging portion 252 that overhangs outward with respect to a vertical line (a tangent to the outer periphery of the differential ring gear 45, which is indicated by the broken line in FIG. 10) that extends upward from a 90-degree rotated portion 251 which is a portion of the outer wall surface along the case-side mating surface 241 at a location rotated from the vertically lower portion of the differential ring gear 45 by 90 degrees in the rotational direction of the differential ring gear 45; and an extending rib 260 that extends from the overhanging portion 252 toward the substantive center of rotation of the differential ring gear 45 to the vicinity of the outer periphery of the differential ring gear 45. A splattering space 250 to which working oil raked up by the differential ring gear 45 is splattered is formed by the inner surface of the overhanging portion 252, a lower surface 262 of the extending rib 260, and the outer periphery of the differential ring gear 45. As illustrated in FIG. 11, the lower surface 262 of the extending rib 260 which serves as the upper wall of the splattering space 250 is formed as an inclined surface such that working oil is pushed toward the case-side mating surface 241 (toward the converter housing 220) when working oil raked up by the differential ring gear 45 to be splattered collides against the lower surface 262. Therefore, working oil raked up by the differential ring gear 45 to reach the 90-degree rotated portion 251 is splattered in a tangential direction (vertically upward direction), collides against the lower surface 262 of the extending rib 260 without colliding against the overhanging portion 252, is pushed toward the converter housing 220 because of the inclination of the lower surface 262 of the extending rib 260, and flows into the working oil storage chamber 65.

As illustrated in FIG. 11, an upper surface 264 of the extending rib 260 which serves as the upper wall of the splattering space 250 is formed as an inclined surface such that working oil flowing down from above is pushed toward the case-side mating surface 241 (toward the converter housing 220). The transaxle case 240 is provided with a guide rib 270 that extends along the outer edge of the reservoir plate 70 from the upper surface 264 of the extending rib 260 to the vicinity of the top portion of the reservoir plate 70. The guide rib 270 is formed so as to project toward the converter housing 220 with respect to the outer edge of the reservoir plate 70. Therefore, working oil flowing down from above the vicinity of the extending rib 260 is pushed toward the converter housing 220 because of the inclination of the upper surface 264 of the extending rib 260, and flows into the working oil storage chamber 65 without climbing over the guide rib 270 to flow into the differential chamber 60. On the other hand, working oil flowing down from above a location away from the extending rib 260 flows into the working oil storage chamber 65 without climbing over the guide rib 270 to flow into the differential chamber 60.

A sector-shaped cutaway portion 74 that exposes a portion of the differential ring gear 45 from a tooth tip 45a to a tooth root 45b is formed in a portion of the flange portion 72 of the reservoir plate 70 aligned with the splattering space 250 slightly on the lower side with respect to the extending rib 260. As discussed above, the differential ring gear 45 is constituted as a helical gear, which is formed so as to provide a motion component directed toward the converter housing 220 by a thrust force to working oil raked up by the differential ring gear 45 to be splattered from the 90-degree rotated portion 251. Therefore, working oil raked up by the differential ring gear 45 is directly splattered from the cutaway portion 74 toward the converter housing 220 to fall down into the working oil storage chamber 65. In the embodiment, the cutaway portion 74 is formed such that, as seen in the rotational direction of the differential ring gear 45, an opening terminal-end portion (an end portion in the vicinity of the extending rib 260) 74b of the cutaway portion 74 is advanced in the rotational direction of the differential ring gear 45 with respect to the intersection point between a tangential line (the straight dash-double-dot line in FIG. 10) that extends in the rotational direction from the tooth root 45b of the differential ring gear 45 at an opening initial-end portion (an end portion in the vicinity of the 90-degree rotated portion 251) 74a and the outer periphery (the curved dash-double-dot line in FIG. 10) of the tooth tip 45a of the differential ring gear 45. Therefore, even working oil splattered from the tooth root 45b in the vicinity of the opening initial-end portion 74a reaches a location on the converter housing 220 side with respect to the reservoir plate 70.

In addition, a projecting portion 75 which projects toward the converter housing 220 and the upper surface and the lower surface of which are inclined in the radial direction of the differential ring gear 45 is formed at the upper end of the cutaway portion 74 of the reservoir plate 70. Therefore, working oil flowing down from above, that is, working oil pushed out toward the converter housing 220 because of the inclination of the upper surface 264 of the extending rib 260 to flow down onto the vicinity of the cutaway portion 74, is guided by the upper surface of the projecting portion 75, with the projecting portion 75 functioning as a drainpipe, to flow from the cutaway portion 74 into the working oil storage chamber 65 without flowing into the differential chamber 60. Meanwhile, a part of working oil raked up by the differential ring gear 45 to be directly splattered from the cutaway portion 74 collides against the lower surface of the projecting portion 75. Since the projecting portion 75 is formed so as to project toward the converter housing 220, however, the working oil which has collided against the projecting portion 75 flows down toward the working oil storage chamber 65.

In the power transfer device 20 according to the embodiment described above, the transaxle case 240 is provided with the overhanging portion 252 which overhangs outward with respect to a vertical line (a tangential line) that extends upward from the 90-degree rotated portion 251 which is a portion of the outer wall surface at a location rotated from the vertically lower portion of the differential ring gear 45 by 90 degrees in the rotational direction of the differential ring gear 45, and the extending rib 260 which extends from the overhanging portion 252 toward the center of rotation of the differential ring gear 45 to the vicinity of the outer periphery of the differential ring gear 45, the splattering space 250 is formed by the overhanging portion 252 and the extending rib 260 together with the outer periphery of the differential ring gear 45, and the lower surface 262 of the extending rib 260 is formed as an inclined surface such that working oil is pushed toward the converter housing 220 when working oil raked up by the differential ring gear 45 to be splattered collides against the lower surface 262, which allows working oil raked up by the differential ring gear 45 to be splattered to the splattering space 250, collide against the lower surface 262 of the extending rib 260 without colliding against the overhanging portion 252, and be pushed toward the converter housing 220. As a result, it is possible to suppress a residence of working oil in the differential chamber 60 by causing the working oil to flow out of the differential chamber 60, and to further reduce the stirring resistance of working oil which acts on the differential ring gear 45.

In the power transfer device 20 according to the embodiment, in addition, the upper surface 264 of the extending rib 260 is formed as an inclined surface such that working oil flowing down from above is pushed toward the converter housing 220, which allows working oil flowing down from above the vicinity of the extending rib 260 to be pushed toward the converter housing 220. As a result, it is possible to suppress an inflow of working oil into the differential chamber 60, and to reduce the amount of working oil residing in the differential chamber 60.

In the power transfer device 20 according to the embodiment, the guide rib 270 which extends along the outer edge of the reservoir plate 70 from the upper surface 264 of the extending rib 260 to the vicinity of the top portion of the reservoir plate 70 to project toward the converter housing 220 with respect to the outer edge of the reservoir plate 70 is formed, which allows working oil flowing down from above the guide rib 270 to flow into the working oil storage chamber 65 without flowing into the differential chamber 60. As a result, it is possible to suppress an inflow of working oil into the differential chamber 60, and to reduce the amount of working oil residing in the differential chamber 60.

In the power transfer device 20 according to the embodiment, the sector-shaped cutaway portion 74 which exposes a portion of the differential ring gear 45 from the tooth tip 45a to the tooth root 45b is formed in a portion of the flange portion 72 of the reservoir plate 70 aligned with the splattering space 250 slightly on the lower side with respect to the extending rib 260, and the helix of the differential ring gear 45 is formed so as to provide a motion component directed toward the converter housing 220 to working oil raked up by the differential ring gear 45 to be splattered to the splattering space 250, which allows the working oil raked up by the differential ring gear 45 to be directly splattered from the cutaway portion 74 toward the converter housing 220. As a result, it is possible to suppress a residence of working oil in the differential chamber 60, and to further reduce the stirring resistance of working oil which acts on the differential ring gear 45. Moreover, the cutaway portion 74 is formed such that, as seen in the rotational direction of the differential ring gear 45, the opening terminal-end portion 74b of the cutaway portion 74 is advanced in the rotational direction of the differential ring gear 45 with respect to the intersection point between a tangential line that extends in the rotational direction from the tooth root 45b of the differential ring gear 45 at the opening initial-end portion 74a and the outer periphery of the tooth tip 45a of the differential ring gear 45, which allows even working oil splattered from the tooth root 45b in the vicinity of the opening initial-end portion 74a to reach a location on the converter housing 220 side with respect to the reservoir plate 70 and flow into the working oil storage chamber 65. As a result, it is possible to suppress a residence of working oil in the differential chamber 60 by causing the working oil to flow out of the differential chamber 60, and to further reduce the stirring resistance of working oil which acts on the differential ring gear 45.

In the power transfer device 20 according to the embodiment, the projecting portion 75 which projects toward the converter housing 220 and the upper surface and the lower surface of which are inclined in the radial direction of the differential ring gear 45 is formed at the upper end of the cutaway portion 74 of the reservoir plate 70, which allows working oil flowing down onto the vicinity of the cutaway portion 74 to be guided with the projecting portion 75 functioning as a drainpipe so that the working oil can flow down from the cutaway portion 74 toward the working oil storage chamber 65 without flowing into the differential chamber 60. In addition, a part of working oil raked up by the differential ring gear 45 to be directly splattered from the cutaway portion 74 can be caused to collide against the lower surface of the projecting portion 75 to flow down toward the working oil storage chamber 65. As a result, it is possible to suppress an increase in amount of working oil flowing into and residing in the differential chamber 60, and to further reduce the stirring resistance of working oil which acts on the differential ring gear 45.

In the power transfer device 20 according to the embodiment, originally, the first seal portion 77 is formed at the outer edge portion including the bottom portion of the flange portion 72 of the reservoir plate 70, and abuts against the housing-side stepped surface 223 of the converter housing 220 to secure seal of the first seal portion 77, and the second seal portion 78 is formed to extend from the bottom portion of the flange portion 72 toward the side opposite to the first seal portion 77, and abuts and is pressed against the rib 242 of the transaxle case 240 to secure seal of the second seal portion 78. The second seal portion 78 is formed linearly, and thus the state of contact with the rib 242 can be maintained, even if the second seal portion 78 is pressed and deformed by the rib 242, compared to a seal portion with an arc-shaped or curved outer edge, which makes it possible to secure seal better. As a result, it is possible to better suppress an inflow of working oil from the working oil storage chamber 65 into the differential chamber 60, and to further reduce the stirring resistance of working oil which acts on the differential ring gear 45.

In the power transfer device 20 according to the embodiment, the upper surface 264 of the extending rib 260 is formed as an inclined surface such that working oil flowing down from above is pushed toward the converter housing 220. However, the upper surface 264 of the extending rib 260 may not be formed as an inclined surface.

In the power transfer device 20 according to the embodiment, the guide rib 270 is formed to extend along the outer edge of the reservoir plate 70 from the upper surface 264 of the extending rib 260 to the vicinity of the uppermost portion of the reservoir plate 70. However, such a guide rib 270 may not be provided.

In the power transfer device 20 according to the embodiment, the cutaway portion 74 is formed in a portion of the flange portion 72 of the reservoir plate 70 aligned with the splattering space 250 slightly on the lower side with respect to the extending rib 260. However, the cutaway portion may not be formed in a portion aligned with the splattering space 250.

In the power transfer device 20 according to the embodiment, the sector-shaped cutaway portion 74 is formed so as to expose a portion of the differential ring gear 45 from the tooth tip 45a to the tooth root 45b. However, it is only necessary that at least the tooth tip 45a of the differential ring gear 45 should be exposed from the cutaway portion 74, and the cutaway portion 74 may be formed so as not to expose the tooth root 45b. In consideration of the effect of directly splattering working oil from the cutaway portion 74 toward the converter housing 220, the cutaway portion 74 is preferably formed so as to expose about half or more of a portion of the differential ring gear 45 from the tooth tip 45a to the tooth root 45b.

In the power transfer device 20 according to the embodiment, the cutaway portion 74 is formed such that, as seen in the rotational direction of the differential ring gear 45, the opening terminal-end portion 74b of the cutaway portion 74 is advanced in the rotational direction of the differential ring gear 45 with respect to the intersection point between a tangential line that extends in the rotational direction from the tooth root 45b of the differential ring gear 45 at the opening initial-end portion 74a and the outer periphery of the tooth tip 45a of the differential ring gear 45. However, the cutaway portion 74 may be formed such that the opening terminal-end portion 74b is lagged in the rotational direction of the differential ring gear 45 with respect to the intersection point.

In the power transfer device 20 according to the embodiment, the projecting portion 75 which projects toward the converter housing 220 and the upper surface and the lower surface of which are inclined in the radial direction of the differential ring gear 45 is formed at the upper end of the cutaway portion 74 of the reservoir plate 70. However, the upper surface or the lower surface of the projecting portion 75 may not be formed as an inclined surface. Alternatively, the projecting portion 75 may not be formed.

While a mode for carrying out the present disclosure has been described above by way of an embodiment, it is a matter of course that the present disclosure is not limited to the embodiment in any way, and that the present disclosure may be implemented in various forms without departing from the scope of the present disclosure.

In the power transfer device according to the present disclosure, an upper surface of the extending rib may be formed as an inclined surface lowered on the second case mating surface side. This allows working oil flowing down to flow toward the second case mating surface, that is, toward the working oil storage chamber which is formed by the partitioning member. As a result, it is possible to suppress an inflow of working oil flowing down into the differential chamber. In this case, the second case member may have a guide rib that extends along an outer edge of the partitioning member from an end portion of the upper surface of the extending rib to the vicinity of an uppermost portion of the partitioning member. This makes it possible to suppress an inflow of working oil flowing down from a location above the guide rib into the differential chamber. In this case, further, the guide rib may project toward the first case member with respect to the outer edge of the partitioning member. This makes it possible to more effectively suppress an inflow of working oil flowing down from a location above the guide rib into the differential chamber.

In the power transfer device according to the present disclosure, the differential ring gear may be constituted as a helical gear configured to provide a motion component directed toward the second case mating surface to working oil splattered to the splattering space. This makes it possible to provide a motion component directed toward the second case mating surface to working oil splattered to the splattering space, and therefore working oil can be more effectively caused to collide against the lower surface of the extending rib and be pushed toward the second case mating surface (toward the working oil storage chamber). In this case, the differential ring gear may be constituted as a helical gear formed such that a tooth trace thereof is lagged in a rotational direction from a side of the differential chamber toward the working oil storage chamber in the cutaway portion. This makes it possible to provide a motion component directed toward the working oil storage chamber to raked-up working oil.

In the power transfer device according to an aspect of the present disclosure in which a motion component by a thrust force is provided to working oil, the partitioning member may have a cutaway portion positioned below the extending rib so as to be aligned with a part of the splattering space and formed so as to expose at least a part of teeth of the differential ring gear. This allows raked-up working oil to be splattered from the cutaway portion toward the working oil storage chamber, which makes it possible to suppress a residence of working oil in the differential chamber. In this case, the partitioning member may have a projecting portion provided at an upper end portion of the cutaway portion to project toward the first case member, an upper surface of the projecting portion extending in a radial direction of the differential ring gear. This makes it possible to suppress an inflow of working oil flowing down from above into the differential chamber via the cutaway portion.

In the power transfer device according to the present disclosure, the first case member may be provided with a first stepped surface formed in the vicinity of the bottom portion of the first case mating surface and stepped inward from the first case mating surface; the second case member may be provided with a rib formed to extend from the vicinity of the bottom portion of the second case mating surface toward the center along the outer edge of the partitioning member; and the partitioning member may be provided with a first seal portion formed in a first range of the outer peripheral portion that extends in one direction from the bottom portion, including the bottom portion, to abut against and seal the first stepped surface, and a second seal portion formed in a second range of the outer peripheral portion that extends in the other direction from the vicinity of an end portion of the first range on the bottom portion side to extend in the radial direction and abut against the rib. This allows the first seal portion of the partitioning member to abut against the first stepped surface to secure seal of the first seal portion, and allows the second seal portion to abut against the rib of the second case member to secure seal of the second seal portion. Consequently, it is possible to better suppress an inflow of working oil into the differential chamber in which the differential ring gear and the differential gear are disposed, and to further reduce the stirring resistance of working oil which acts on the differential ring gear.

INDUSTRIAL APPLICABILITY

The present disclosure is applicable, for example, to the power transfer device manufacturing industry etc.

The invention claimed is:

1. A power transfer device comprising:
a differential ring gear disposed below a drive pinion gear on the input side and meshed with the drive pinion gear;
a differential gear coupled to the differential ring gear;
a case that houses the differential ring gear and the differential gear; and a partitioning member that partitions a space in the case into a differential chamber, in which the differential ring gear and the differential gear are disposed, and a working oil storage chamber, in which working oil is stored, wherein:
the case has a first case member which is provided with a first case mating surface at an outer edge and in which the working oil storage chamber is formed by the partitioning member, and a second case member which is provided with a second case mating surface aligned with the first case mating surface and in which the differential chamber is formed by the partitioning member;
the second case member has an overhanging portion that overhangs radially outward with respect to the differential ring gear than a vertical line that extends upward from a 90-degree rotated portion which is a portion of an outer wall surface along the second case mating surface at a location rotated from a vertically lower portion of the differential ring gear by 90 degrees in a rotational direction of the differential ring gear during forward travel, and an extending rib that extends from the overhanging portion toward a substantive center of rotation of the differential ring gear, and a splattering space to which working oil raked up by the differential ring gear is splattered is formed by an inner surface of the overhanging portion, a lower surface of the extending rib, and an outer periphery of the differential ring gear; and
the lower surface of the extending rib is formed as an inclined surface raised on of the second case mating surface side.

2. The power transfer device according to claim 1, wherein
an upper surface of the extending rib is formed as an inclined surface lowered on the second case mating surface side.

3. The power transfer device according to claim 2, wherein
the second case member has a guide wall that extends along an outer edge of the partitioning member from an end portion of the upper surface of the extending rib toward an uppermost portion of the partitioning member.

4. The power transfer device according to claim 3, wherein
the guide wall projects from the outer edge of the partitioning member toward the first case member.

5. The power transfer device according to claim 4, wherein
the differential ring gear is constituted as a helical gear configured to provide a motion component directed toward the second case mating surface to working oil splattered to the splattering space.

6. The power transfer device according to claim 5, wherein
the differential ring gear is constituted as a helical gear formed such that a tooth trace thereof lags behind in a rotational direction from the differential chamber side toward the working oil storage chamber in a cutaway portion that is formed on a portion of a flange portion of the partitioning member that is aligned with the splattering space.

7. The power transfer device according to claim 1, wherein
the differential ring gear is constituted as a helical gear configured to provide a motion component directed toward the second case mating surface to working oil splattered to the splattering space.

8. The power transfer device according to claim 7, wherein
the differential ring gear is constituted as a helical gear formed such that a tooth trace thereof lags behind in a rotational direction from the differential chamber side toward the working oil storage chamber in a cutaway portion that is formed on a portion of a flange portion of the partitioning member that is aligned with the splattering space.

9. The power transfer device according to claim 2, wherein
the differential ring gear is constituted as a helical gear configured to provide a motion component directed toward the second case mating surface to working oil splattered to the splattering space.

10. The power transfer device according to claim 9, wherein
the differential ring gear is constituted as a helical gear formed such that a tooth trace thereof lags behind in a rotational direction from the differential chamber side toward the working oil storage chamber in a cutaway portion that is formed on a portion of a flange portion of the partitioning member that is aligned with the splattering space.

11. The power transfer device according to claim 3, wherein
the differential ring gear is constituted as a helical gear configured to provide a motion component directed toward the second case mating surface to working oil splattered to the splattering space.

12. The power transfer device according to claim 11, wherein
the differential ring gear is constituted as a helical gear formed such that a tooth trace thereof lags behind in a rotational direction from the differential chamber side toward the working oil storage chamber in a cutaway portion that is formed on a portion of a flange portion of the partitioning member that is aligned with the splattering space.

13. A power transfer device comprising:
a differential ring gear disposed below a drive pinion gear on the input side and meshed with the drive pinion gear;
a differential gear coupled to the differential ring gear;
a case that houses the differential ring gear and the differential gear; and a partitioning member that partitions a space in the case into a differential chamber, in which the differential ring gear and the differential gear are disposed, and a working oil storage chamber, in which working oil is stored, wherein:
the case has a first case member which is provided with a first case mating surface at an outer edge and in which the working oil storage chamber is formed by the partitioning member, and a second case member which is provided with a second case mating surface aligned with the first case mating surface and in which the differential chamber is formed by the partitioning member;
the second case member has an overhanging portion that overhangs outward with respect to a vertical line that extends upward from a 90-degree rotated portion which is a portion of an outer wall surface along the second case mating surface at a location rotated from a vertically lower portion of the differential ring gear by 90 degrees in a rotational direction of the differential ring gear, and an extending rib that extends from the overhanging portion toward a substantive center of rotation of the differential ring gear, and a splattering space to which working oil raked up by the differential ring gear is splattered is formed by an inner surface of the overhanging portion, a lower surface of the extending rib, and an outer periphery of the differential ring gear;
the lower surface of the extending rib is formed as an inclined surface raised on of the second case mating surface side;
the differential ring gear is constituted as a helical gear configured to provide a motion component directed toward the second case mating surface to working oil splattered to the splattering space; and
the differential ring gear is constituted as a helical gear formed such that a tooth trace thereof lags behind in a rotational direction from the differential chamber side toward the working oil storage chamber in a cutaway portion that is formed on a portion of a flange portion of the partitioning member that is aligned with the splattering space.

* * * * *